US005186152A

United States Patent [19]

Cortochiato et al.

[11] Patent Number: 5,186,152

[45] Date of Patent: Feb. 16, 1993

[54] AUTOMOTIVE FUEL SYSTEM

[75] Inventors: Michael L. Cortochiato, Farmington Hills; Sammy C. Lumetta, Rochester Hills, both of Mich.

[73] Assignee: General Motors Corporation, Detroit, Mich.

[21] Appl. No.: 833,257

[22] Filed: Feb. 10, 1992

[51] Int. Cl.[5] ...................... F02M 37/04; F16K 31/18

[52] U.S. Cl. .................................... 123/514; 123/510; 123/516; 137/576; 137/448

[58] Field of Search ............... 123/514, 509, 510, 512, 123/516; 137/571, 574, 576, 448; 220/20, 20.5

[56] References Cited

U.S. PATENT DOCUMENTS 4,279,232 7/1981 Schuster .............................. 123/514
4,672,937 6/1987 Fales .................................. 123/514
4,922,959 5/1990 Sasaki ................................ 123/514
4,926,829 5/1990 Tuckey .............................. 123/514
5,058,741 8/1991 Tuckey .............................. 123/509
5,080,077 1/1992 Sawert .............................. 123/509

*Primary Examiner*—Carl S. Miller
*Attorney, Agent, or Firm*—Saul Schwartz

[57] ABSTRACT

An automotive fuel system including a reservoir in a fuel tank of the vehicle and a fuel pump in the reservoir. Surplus fuel from a fuel injection system is returned to and confined in the reservoir. An inside screen is disposed between an inlet of the fuel pump and an inlet port from the fuel tank into the reservoir. The inside screen has a porous wall permeable to liquid fuel and impermeable to vapor when partially submerged in liquid fuel. An outside screen surrounds the inlet port in the fuel tank and has a porous wall permeable to liquid fuel and impermeable to vapor when partially submerged in liquid fuel. The porous wall of the inside and outside screens cooperate in sustaining suction at the fuel pump inlet when the reservoir is depleted.

2 Claims, 2 Drawing Sheets

AUTOMOTIVE FUEL SYSTEM

FIELD OF THE INVENTION

This invention relates to automobile fuel systems wherein a fuel pump is mounted in a reservoir in a fuel tank of the vehicle.

BACKGROUND OF THE INVENTION

In typical automotive fuel systems with fuel injection, a fuel pump in a fuel tank of the vehicle pumps fuel at high pressure to a fuel rail or distributor of the fuel injection apparatus. The flow rate from the pump to the fuel rail exceeds engine demand under all circumstances. Surplus, which is usually hot due to the proximity of the fuel rail to the engine, is returned to the fuel tank through a low pressure conduit at a rate which varies from maximum at engine idle to minimum at full power. U.S. Pat. No. 4,989,572, issued Feb. 5, 1991 and assigned to the assignee of this invention, describes an automotive fuel system wherein surplus is returned to and confined in a closed reservoir containing the fuel pump so that mixture of surplus with fuel in the fuel tank is minimized to retard heating of the fuel in the fuel tank and vapor generation in the tank. A fuel system according to this invention is an improvement of the system described in the aforesaid U.S. Pat. No. 4,989,572.

SUMMARY OF THE INVENTION

This invention is a new and improved automotive fuel system including a reservoir in a fuel tank of the vehicle and a fuel pump in the reservoir. Surplus fuel is returned to and confined in the reservoir to minimize heating and vapor generation in the fuel tank. An inside screen, made of a porous material through which liquid fuel flows unimpeded but which forms a vapor barrier when partially submerged in fuel, is disposed in the reservoir between an inlet of the fuel pump and an inlet port of the reservoir. An outside screen made of material having the same characteristics as the inside screen is disposed in the fuel tank around the inlet port. Liquid fuel in the reservoir flows unimpeded through the inside screen to the pump inlet in preference to fuel from the fuel tank. When the reservoir is depleted enough to expose part of the inside screen, vapor penetration through the exposed part to the pump inlet is blocked. Likewise, when low fuel in the fuel tank partially exposes the outside screen, vapor penetration through the exposed part is blocked. By blocking vapor penetration, interruption of suction at the pump inlet is prevented and a pressure gradient is maintained which promotes inflow from the tank to the pump inlet.

DESCRIPTION OF A PREFERRED EMBODIMENT

Figure 1:
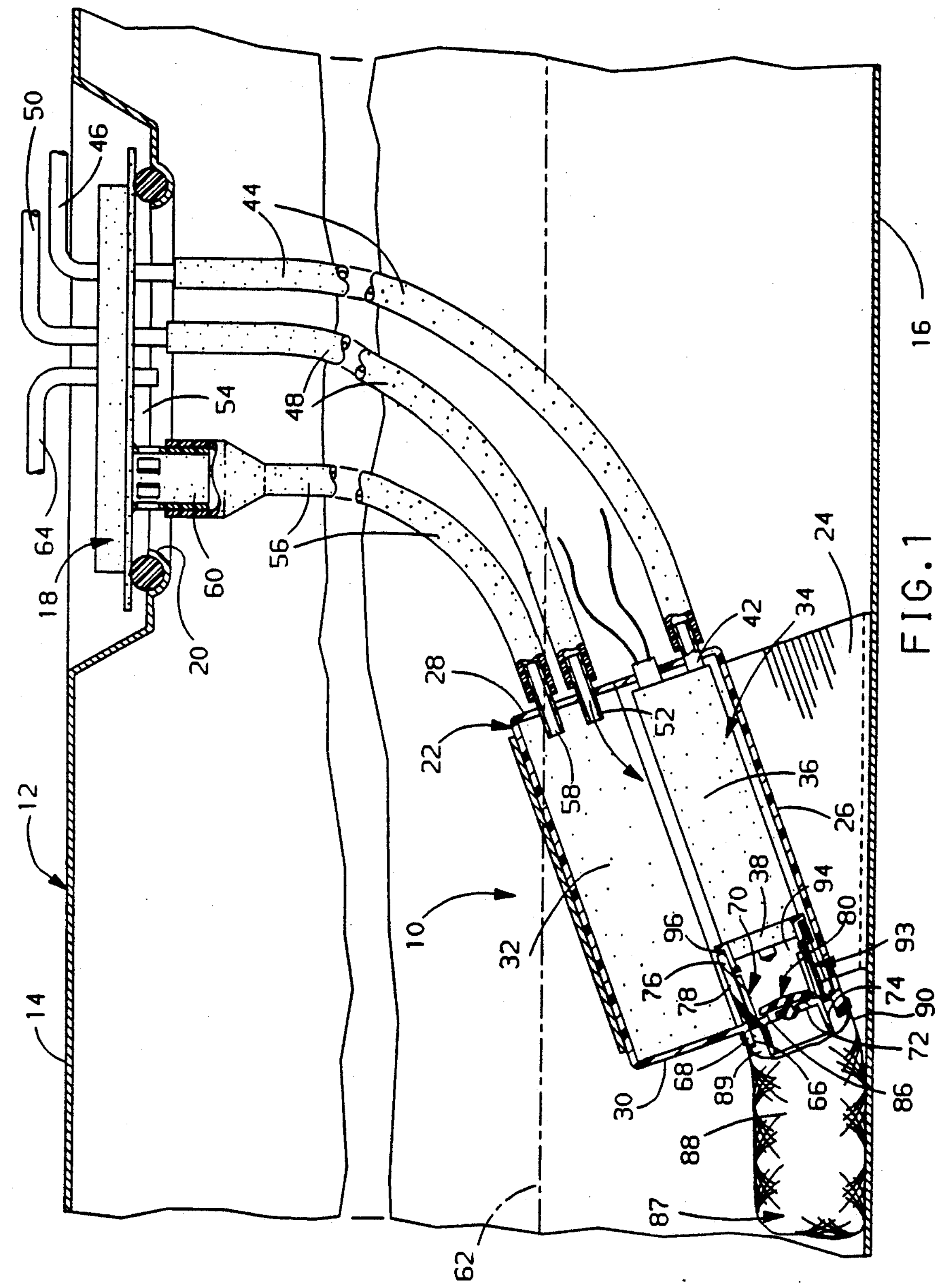
FIG. 1 is a side elevational view, partially in cross section, of an automotive fuel system according to this invention.

Referring to the drawings, an automotive fuel system (10) according to this invention is disposed in a fuel tank (12) having a top wall (14) and a bottom wall (16). A cover (18) closes and seals an access port (20) in the top wall (14). A molded plastic container (22) inside the fuel tank (12) is connected to the bottom wall (16) by a bracket (24). The container (22) has a side wall (26), an upper end wall (28), and a lower end wall (30) all cooperating to define a substantially closed reservoir (32) inside the container. The container (22) and the bracket (24) are preferably located in a trough, not shown, of the fuel tank which concentrates fuel around the container whenever there is fuel in the tank.

Figure 2:
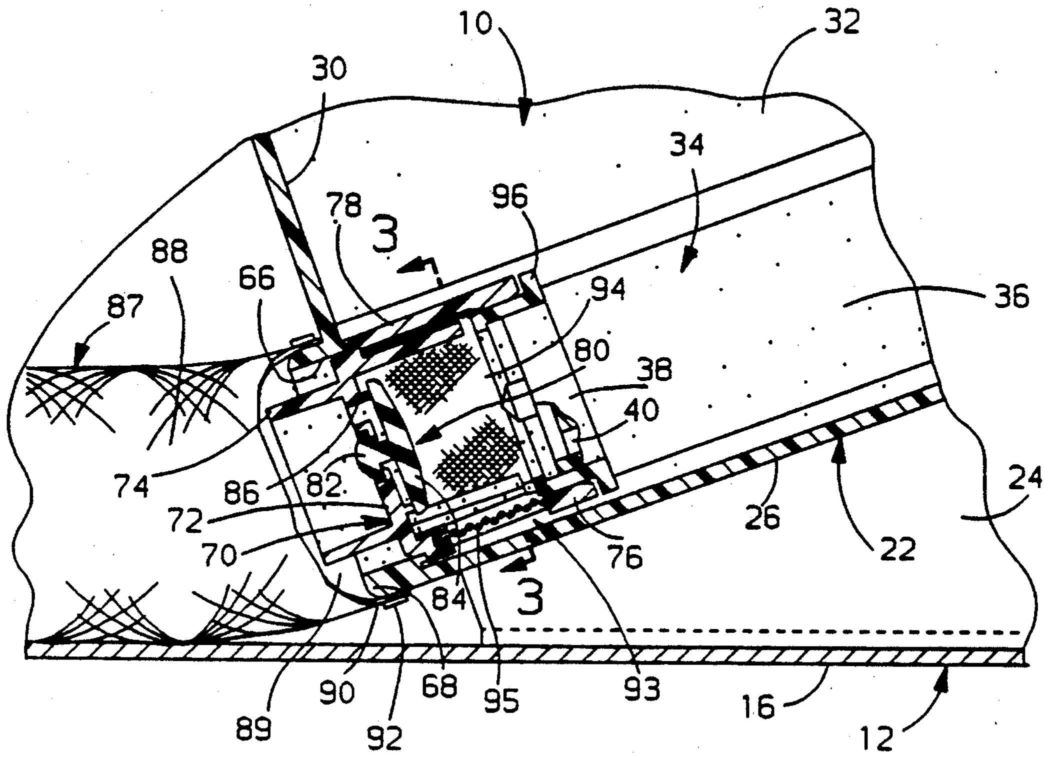
FIG. 2 is an enlarged view of a portion of FIG. 1.
Figure 3:
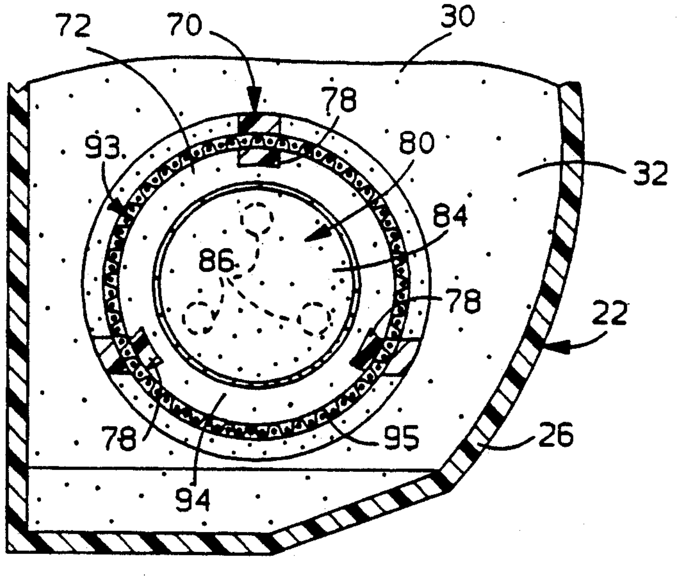
FIG. 3 is a sectional view taken generally along the plane indicated by lines 3—3 in FIG. 2.

An electric fuel pump (34) is disposed in the reservoir (32) and includes a cylindrical body (36), an annular flange (38) surrounding an inlet (40) of the pump, FIG. 2, and a discharge (42) projecting through the upper end wall (28) of the container (22). When the pump (34) is on, the internal pumping aggregate thereof, not shown, induces mild suction or partial vacuum at the inlet (40). U.S. Pat. No. 4,718,827, issued Jan. 12, 1988 and assigned to the assignee of this invention, describes a representative electric fuel pump suitable for this application.

A high pressure hose (44) is connected to the discharge (42) outside the container (22) and to a fluid connector (46) on the cover (18). A conduit, not shown, outside the fuel tank extends from the connector (46) to a fuel rail of a fuel injection apparatus, not shown, on an engine of the vehicle for conducting high pressure fuel to the fuel rail.

A first low pressure hose (48) in the tank (12) is connected to a fluid connector (50) on the cover (18) and to the reservoir (32) through a short tube (52) on the upper end wall (28) of the container (22). A conduit, not shown, outside the fuel tank extends from the fuel rail to the connector (50) and cooperates with the hose (48) and the tube (52) in conducting surplus fuel from the fuel rail back to the reservoir (32). The rate of flow of surplus fuel to the reservoir varies from maximum at engine idle to minimum at maximum engine power.

The reservoir (32) is vented to an uppermost extremity (54) of the fuel tank (12) through a second low pressure hose (56) connected to a short tube (58) on the upper end wall (28) of the container (22) and to a slotted, cylindrical flange (60) on the cover (18). The uppermost extremity (54) is above the maximum elevation attained by a surface (62) of the pool of fuel in the fuel tank (12). A fluid connector (64) on the cover (18) is open to the uppermost extremity (54) of the fuel tank and is connected by a hose, not shown, outside the fuel tank to a remote vapor trap.

A circular aperture (66), FIG. 2, in the lower end wall (30) of the container (22) is located near the lowest extremity of the reservoir (32) and is surrounded by an annular flange (68) in the fuel tank integral with the lower end wall. A generally cup-shaped frame (70) is spin welded to the lower end wall (30) in the aperture (66). The frame (70) includes a circular web (72) in the plane of the lower end wall (30), an annular flange (74) integral with the web (72) outside the reservoir (32) and concentric with the annular flange (38), and a circular lip (76) inside the reservoir connected to the web (72) by a plurality of integral struts (78).

A rubber umbrella valve (80) has a stem (82) attached to the center of the web (72) and a flexible circular head (84) in the reservoir overlying perforations in the web defining a plurality of inlet ports (86) to the reservoir. The head (84) normally lays flat against the web (72) but deflects upward to uncover the inlet ports when the static pressure adjacent the web outside the reservoir

(32) exceeds static pressure adjacent the web inside the reservoir.

A preformed outside screen (87) in the fuel tank (12) has a porous wall (88), a hollow interior (89), and an open neck (90) surrounding the flange (68) on the lower end wall (30) of the container (22). The open neck is sealed against the flange (68) by a retaining ring (92) to prevent bypass of liquid and/or vapor around the porous wall (88). The porous wall (88) is made of synthetic material such as polyvinyl chloride and has a lattice-like weave or pattern through which liquid fuel flows unimpeded but which forms a vapor barrier when only partially submerged in liquid fuel due to capillary action of the lattice and surface tension of liquid captured in the interstices of the lattice A preformed inside screen (93) in the container (22) has a hollow interior (94) defined within a cylindrical porous wall (95) the opposite ends of which are continuously attached to the frame (70) around the lip (76) and around the web (72) The porous wall (95) is made of synthetic material such as polyvinyl chloride and has a lattice-like weave or pattern through which liquid fuel flows unimpeded but which forms a vapor barrier when only partially submerged in liquid fuel due to capillary action of the lattice and surface tension of liquid captured in the interstices of the lattice The hollow interior (94) of the inside screen (93) is in series flow connection between the fuel pump inlet (40) and the hollow interior (89) of the outside screen through the inlet ports (86). The spin weld connection of the frame (70) to the container (22) defines a fluid seal which cooperates with a rubber seal (96) between the lip (76) of the frame (70) and the flange (38) on the fuel pump in preventing liquid and/or vapor in the reservoir from bypassing the porous wall (95). The spin weld connection also defines a fluid seal preventing flow between the fuel tank (12) and the reservoir (32) except through the inlet ports (86).

When the engine of the vehicle is off, fuel in the tank (12) flows unimpeded through the porous wall (88) of the outside screen and exerts static pressure against the head (84) of the umbrella valve through the inlet ports (86). If the surface (62) of the pool of fuel in the tank (12) is above the surface of the pool of fuel in the reservoir, the static pressure gradient deflects the head (84) of the umbrella valve and fuel flows by gravity into the hollow interior (94) of the inside screen (93) and through the porous wall (95) thereof into the reservoir (32) until the surfaces equalize. The head (84) of the umbrella valve prevents backflow from the reservoir (32) into the fuel tank.

In the container (22), the characteristic of the porous wall (95) permitting unimpeded liquid flow from the reservoir (32) into the hollow interior (94) of the inside screen (93) effectively places the fuel pump inlet (40) in direct communication with the reservoir (32) with respect to liquid fuel in the reservoir. Accordingly, the fuel pump (34) operates as described in the aforesaid U.S. Pat. No. 4,989,572 to recirculate surplus fuel in the reservoir to the fuel rail in preference to fuel from the fuel tank (12) when the inside screen is submerged.

As the fuel pump depletes the reservoir due to the imbalance between pump discharge and surplus return, the surface level of the pool of fuel in the reservoir is lowered to a level corresponding to exposure of the pump inlet to vapor in the reservoir and interruption of fuel pump discharge. The same surface level also corresponds to exposure to vapor in the reservoir of a portion of the porous wall (95) of the inside screen. The exposed portion of the porous wall, however, being vapor-impermeable, blocks entry of vapor into the hollow interior (94) of the inside screen so that the suction at the fuel pump inlet (40) is confined to and sustained in the hollow interior (94) of the inside screen.

In that circumstance, the suction at the pump inlet (40) acts with the static pressure head of the fuel in the tank (12) to promote inflow through the inlet ports (86), through the hollow interior (94) of the inside screen (93), and into the pump inlet (40). In addition, as surplus continues to pour into the reservoir (32), the surplus migrates unimpeded through the porous wall (95) for recirculation to the fuel rail so that the reservoir (32) does not overflow through the reservoir vent slots at the top of the fuel tank.

An important feature of this invention is the cooperation of the inside and outside screens (93,87) when the reservoir (32) is depleted and the surface (62) of the pool of fuel in tank (12) is low enough to partially expose the porous wall (88) of the outside screen (87). In that circumstance, the vapor barriers defined by the exposed portions of each of the porous walls (95,88) of the inside and outside screens (93,87), respectively, prevent dissipation of the suction at the fuel pump inlet (40) so that a pressure gradient is effectively maintained between the hollow interior (89) of the outside screen and the fuel tank above the surface (62). The aforesaid pressure gradient promotes inflow to the hollow interior (89) to maintain fuel flow to the fuel pump inlet.

The embodiments of the invention in which an exclusive property or privilege is claimed are defined as follows:

1. In a fuel tank of a motor vehicle, a fuel system comprising:

a covered container in said fuel tank having an inlet port in a wall of said container for admitting fuel from said fuel tank into a reservoir defined inside said container, a tubular outside screen made of porous material permeable to liquid fuel and impermeable to vapor when said outside screen is partially submerged in fuel and including a neck portion, means attaching said neck portion of said tubular outside screen to said wall of said container around said inlet port and on the side of said wall outside said reservoir so that fuel flows into said container through said inlet port only through said tubular outside screen, means for emptying surplus fuel from a source of surplus fuel into said reservoir inside said container, a fuel pump mounted in said container having an inlet open to said reservoir, means on said fuel pump defining an annular flange located in spaced relation to said inlet port in said wall of said container and surrounding said inlet of said pump, and means defining a tubular inside screen inside said container made of porous material permeable to liquid fuel and impermeable to vapor when said inside screen is partially submerged in fuel and having a first end attached to said wall of said container around said inlet port on the side of said wall inside said reservoir and a second end attached to said fuel pump around said annular flange on said fuel pump so that surplus fuel flows into said inlet of said pump only through said inside screen.

2. The fuel system recited in claim 1 wherein said means defining said tubular inside screen includes:

a cylindrical plastic frame inside said container having a plurality of reinforcing struts each supported at a first end on said wall of said container around said inlet port and at a second end on said annular flange of said fuel pump and defining therebetween a plurality of perforations in said frame, and a screen made of porous material permeable to liquid fuel and impermeable to vapor when said screen is partially submerged in fuel and attached to said frame over said perforations in said frame.

* * * * *